(12) United States Patent
Sen et al.

(10) Patent No.: US 6,691,312 B1
(45) Date of Patent: Feb. 10, 2004

(54) MULTICASTING VIDEO

(75) Inventors: Subhabrata Sen, Amherst, MA (US);
Don Towsley, Amherst, MA (US);
Zhi-Li Zhang, Minneapolis, MN (US);
Jayanta Kumar Dey, Cambridge, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 09/527,656

(22) Filed: Mar. 17, 2000

Related U.S. Application Data (60) Provisional application No. 60/125,240, filed on Mar. 19, 1999.

(51) Int. Cl.[7] .............................................. H04N 7/173
(52) U.S. Cl. ............................ 725/96; 725/95; 725/97; 370/351; 370/400; 709/232
(58) Field of Search ............................ 725/95, 96, 86, 725/97, 119; 370/486, 487, 490, 351, 400; 709/230, 231, 232, 233, 234, 235

(56) References Cited

U.S. PATENT DOCUMENTS 5,940,391 A * 8/1999 Malkin et al. ............... 370/390
6,320,865 B1 * 11/2001 Agrawala et al. ........... 370/413
6,377,972 B1 * 4/2002 Guo et al. ................... 709/201

OTHER PUBLICATIONS

Almeroth et al., "The Use of Multicast Delivery to Provide a Scalable and Interactive Video–on–Demand Service," IEEE Journal of Selected Areas in Communication, vol. 14, No. 6, p. 1110–1122 (1996).

Deering et al., "Multicast Routing in Datagram Internetworks and Extended LANs", ACM Transactions on Computer Systems, vol. 8, No. 2, p. 85–110 (1990).

Feng et al., "A Comparison of Bandwidth Smoothing Techniques for the Transmission of Prerecorded Compressed Video," Proc. IEEE Infocom '97 Conf. Comp. Comm., vol. 1, p. 58–66 (1997).

Garrett et al., "Analysis, Modeling and Generation of Self-Similar VBR Video Traffic," ACM, p. 269–280, (Sep. 1994).

Lakshman et al. "Variable Bit–Rate (VBR) Video Tradeoffs and Potentials," proc. IEEE, vol. 86, p. 952–973 (May 1998).

Rao et al., "Fast Techniques for the Optimal Smoothing of Stored Video," Multimedia Systems, vol. 7, p. 222–233 (1999).

Rexford et al., "Online Smoothing of Live, Variable–Bit–Rate Video," Proceedings of Workshop on Network and Operating System Support . . . , IEEE, p. 235–243 (1997).

Rexford et al., "Smoothing Variable–Bit–Rate Video in an Internetwork," IEEE/ACM Transations on Networking, vol. 7, No. 2, p. 202–215 (Apr. 1999).

(List continued on next page.)

*Primary Examiner*—John Miller
*Assistant Examiner*—Johnny Ma
(74) *Attorney, Agent, or Firm*—Fish & Richardson P.C.

(57) ABSTRACT

A method of multicasting video to multiple client nodes via intermediate nodes that includes accessing video information descriptive of the video to be multicast, accessing information describing a distribution tree of nodes from a source of the video to the multiple clients nodes via one or more internetwork nodes, accessing rate constraints of nodes in the distribution tree, accessing buffer allocations of the nodes in the distribution tree, and determining one or more smoothed transmission schedules for each node in the distribution tree based on the accessed video information, the accessed information describing the distribution tree, the accessed rate constraints of nodes in the distribution tree, and the accessed buffer allocations of the nodes in the distribution tree, the one or more transmission schedules describing the transmission of video data to one or more children nodes.

14 Claims, 7 Drawing Sheets

OTHER PUBLICATIONS

Salehi et al., "Supporting Stored Video: Reducing Rate Variability and End–to–End Resource Requirements Through Optimal Smoothing," IEEE/ACM Transactions on Networking, vol. 6, No. 4, p. 397–410 (1998).

Sen et al. "Optimal Multicast Smoothing of Streaming Video over an Internetwork," Proceedings IEEE Infocom '99 Conf. On Comp. Comm., vol. 2, p. 455–463 (1999).

* cited by examiner

Algorithm Check Feasibility $$(T_1(b_1), A_1(D_i)_{i-V_1})$$

1. Traverse up. Compute $U_i^b$ and $D_i$, $V_i \in V$

2. Traverse Down. Compute $V_i \in V$, $U_i^c$ and $L_i^c$

3. At Each Node $i \in V$,

If $(L_i^c \leq U_i^c)$ Proceed to Next Node Else Return False

If $(L_i^c \leq U_i^c)$ $V_i \in V_i$ Return True

FIG. 6

Algorithm Compute Smooth

Compute $U_i^b$ and $D_i$, $V_i \in V$

Compute $V_i \in V$, $U_i^c$, $L_i^c$ and $G_{p(i)}$

Compute $S_i^*$

FIG. 7

1. At Each Node $i \in V\backslash\{\phi\}$,
   Compute $S_i^{late}$ $b_i^*$ and $w_i^*$ 2. $W^* = \max_{i\_v\_o} W_i^*$ 3. $V_i \in V\backslash\{\phi\}$ $w_i^*$ $b_i^*$

MULTICASTING VIDEO

CROSS REFERENCE TO RELATED APPLICATIONS

This application claims priority from U.S. Provisional Application Serial No. 60/125,240, filed Mar. 19, 1999.

STATEMENT AS TO FEDERALLY SPONSORED RESEARCH

This invention was made with Government support under National Science Foundation grants NCR-9523807, NCR-9508274, and CDA-9502639. The Government may have certain rights in the invention.

FIELD OF THE INVENTION

The invention relates to multicasting video.

BACKGROUND OF THE INVENTION

Development of a high-speed internetworking infrastructure (e.g., the Internet) and digital video technology has led to the emergence of several networked multimedia applications that include streaming video as a media component. Such applications include streaming video broadcasts, distance learning, corporate telecasts, narrowcasts, etc. Digital video traffic typically exhibits high bandwidth requirements and significant burstiness at multiple time scales, owing to the encoding schemes and content variation between and within video scenes. For example, MPEG (Motion Pictures Experts Group) encodes a video in different size frames. Additionally, the information needed to encode each frame can vary, for example, based on how much video information changes from image to image. When combined with other media such as audio, text, HTML (HyperText Markup Language), and images, multi-media transmissions can become even burstier. The high bandwidth requirements coupled with the bursty variable-rate nature of these streams complicates the design of efficient storage, retrieval, and transport mechanisms for such media.

A technique known as workahead smoothing can yield significant reductions in peak rate and rate variability of video transmissions from a server to a single client (i.e. unicast). In smoothing, by transmitting frames early, the sender, or a smoothing node, can coordinate access with the client and can send large video frames at a slower rate without disrupting continuous playback at the client. The frames transmitted ahead of time are temporally stored in buffers present in the server and the client. A characteristic of the smoothed transmission schedule is that the smoothing benefit is a non-decreasing function of buffer sizes present.

SUMMARY OF THE INVENTION

For many applications, streaming video transmission occurs from a server simultaneously to a large number of heterogeneous clients that have different resource capacities (e.g. buffer sizes) and that are scattered geographically over a heterogeneous internetwork that has different resource capacities in different segments. Described herein are techniques that can reduce the bandwidth overhead for such simulcast services.

In general, in one aspect, the invention features a method of multicasting video to multiple client nodes via intermediate nodes. The method includes accessing video information descriptive of the video to be multicast, accessing information describing a distribution tree of nodes from a source of the video to the multiple clients nodes via one or more internetwork nodes, accessing rate constraints of nodes in the distribution tree, accessing buffer allocations of the nodes in the distribution tree, and determining one or more smoothed transmission schedules for each node in the distribution tree based on the accessed video information, the accessed information describing the distribution tree, the accessed rate constraints of nodes in the distribution tree, and the accessed buffer allocations of the nodes, the one or more transmission schedules describing the transmission of video data to one or more children nodes.

Embodiments may include one or more of the following features. Accessing buffer allocations can include determining buffer allocations based on the accessed video information, the accessed information descriptive of a distribution tree, and the accessed rate constraints. Accessing rate constraints may include receiving rate constraints. The determining may include determining an upper constraint for each node, determining a lower constraint for each node, and determining a smoothing schedule based on the determined upper and lower constraints. The determining of a smoothed schedule may use majorization. The method may further include distributing the determined transmission schedules to nodes in the distribution tree. The determined transmission schedules may include schedules that cause at least one node to differentially cache data for distribution to the at least one node's children.

In general, in another aspect, the invention features a computer program product, disposed on a computer readable medium, for multicasting video to multiple client nodes via intermediate nodes. The program includes instructions for causing a processor to access video information descriptive of the video to be multicast, access information describing a distribution tree of nodes from a source of the video to the multiple clients nodes via one or more internetwork nodes, access rate constraints of nodes in the distribution tree, access buffer allocations of the nodes in the distribution tree, and determine one or more smoothed transmission schedules for each node in the distribution tree based on the accessed video information, the accessed information describing the distribution tree, the accessed rate constraints of nodes in the internetwork, the accessed buffer allocations of nodes in the internetwork, and the one or more transmission schedules describing the transmission of video data to one or more children nodes.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control.

In addition, the materials, methods, and examples are illustrative only and not intended to be limiting.

Other features and advantages of the invention will be apparent from the following detailed description, including the figures, and from the claims.

DETAILED DESCRIPTION

Presented herein are techniques that integrate workahead smoothing with multicasting to efficiently multicast streamed video from a server to multiple clients over a distribution tree topology. The techniques use "differential caching", a technique for temporal storing of video frames at intermediate network nodes of the distribution tree. For prerecorded video streaming, integrating smoothing with differential caching is used to compute a set of optimal transmission schedules for a distribution tree, which reduces the peak transmission rate and variability of the video transmission along each link. When buffering at the internal nodes is the constraining resource, techniques can check whether there exists a set of feasible "optimal" multicast schedules to transmit to a particular video. If a feasible "optimal" multicast schedule exists, techniques can determine a set of optimal transmission schedules. When the link bandwidths in the distribution tree are the constraining resource, software can determine the minimal total buffer allocation for all the nodes in the tree, and the corresponding allocation at each node, such that there exists a set of feasible transmission schedules to distribute a particular video. Multicasting smoothed video using schedules computed by the smoothing algorithm can reduce the total transmission bandwidth requirements by more than a factor of three as compared to multicasting of an un-smoothed stream.

Figure 1:
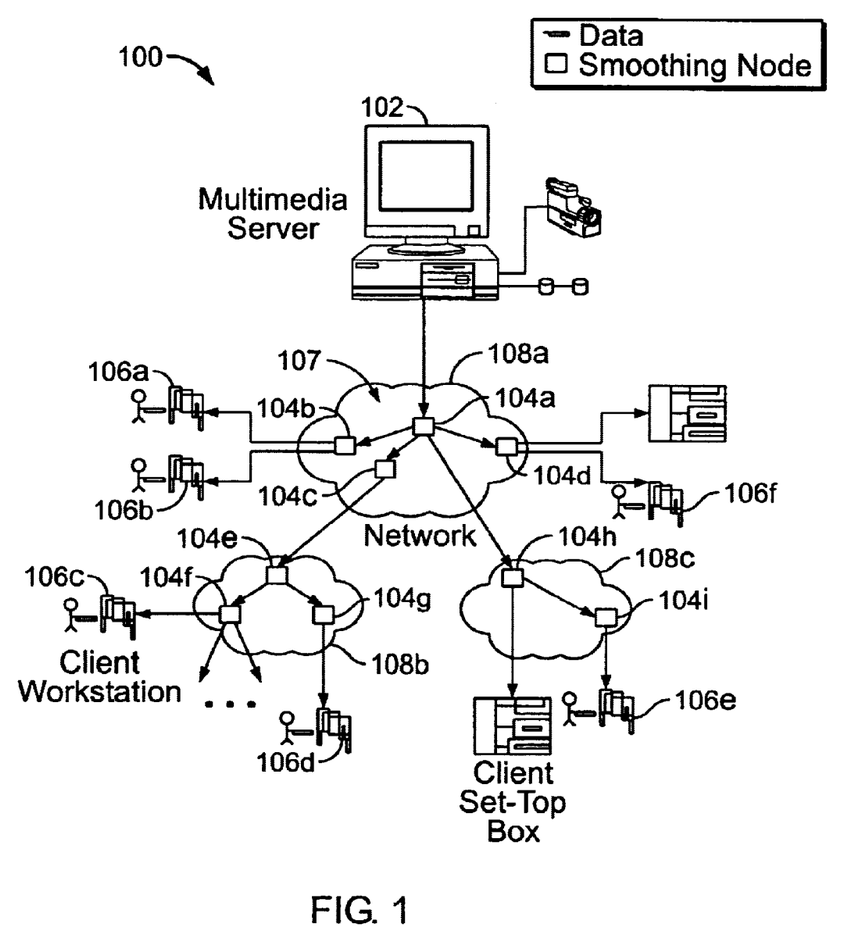
FIG. 1 is a diagram of a network server multicasting video to clients.

FIG. 1 shows a server 102 multicasting streaming video to a number of heterogeneous clients 106a–106e that are connected through a heterogeneous internetwork 100. Segments 108a–108c of the network 100 constitute part of a virtual distribution tree over which the video frames are multicast from a sender 102 to the clients 106a–106e. The clients 106a–106e are leaf nodes of the distribution tree 107. In addition to the clients, the distribution tree 107 includes internal nodes 104a–104i. Each internal node 104a–104i receives video frame data from its parents and transmits the video data to each of its children. The nodes also perform other tasks, described below.

The video distribution tree can assume a variety of forms. For example, in an active network, the internal nodes 104a–104i can be switches or routers in the network. Alternatively, analogous to the active services approach, the nodes 104a–104i can be video gateway or proxy servers that perform special application-specific functions. A recent trend has been the growing deployment of proxies by the ISP's (Internet Service Providers) for caching Web documents. The nodes 104a–104i in the video distribution tree can be co-located at some of these Web proxy servers. In a cable network setting, the head-end and mini-fiber nodes in the network could perform distribution tree node tasks.

In general, the root of the distribution tree may be different from the source content server 102. For example, a proxy or gateway server in a corporate intranet, or a cable head-end may receive streaming video from the remote content server, and simultaneously stream out the video to child nodes on the tree. The distribution tree itself may span multiple network service provider domains. The video service provider can build its distribution tree across multiple domains through cooperative contracts and peering agreements with the various network service providers.

The internetwork is heterogeneous due to different bandwidth capacities, traffic loads, and/or service guarantees that limit capacities for carrying multicast video traffic. The internal nodes 104a–104i in the internetwork may also have different amounts of resources, e.g. different buffer sizes for temporal caching of video frames. Similarly, clients 106a–106f may have different connectivity to the network, e.g. a client 106 could be connected via a slow modem or a high-speed LAN. A client 106 can be a workstation, PC, hand-held multimedia device or a set-top box connected to a television set, thus possessing varying buffering and computational resources.

The following describes effective multicast smoothing solutions that can efficiently transmit video data over an internetwork to a set of clients, where the internetwork or the clients can be constrained either by buffer size availability or bandwidth capacity availability. The approach described takes advantage of the effectiveness of workahead smoothing in a unicast environment. For prerecorded video such smoothing typically involves computing upper and lower constraints on the amount of data that can be transmitted at any instant, based on prior knowledge of frame sizes and the size of the client playback buffer. The bandwidth smoothing algorithm is then used to construct a transmission schedule that reduces burstiness subject to these constraints.

Generalizing the server to single client bandwidth smoothing solution to multicasting of smoothed streaming video over a distribution tree results in an approach that can reduce burstiness and improve reliability by constructing a global "optimal" set of smoothed transmission schedules, one per link of the distribution tree, depending upon the resource constraint (either buffer or bandwidth). The term "optimal", as used herein, refers to performance with respect to one or more criteria such as reduction of the peak rates, rate variability, and the effective bandwidth of the video.

I. Differential Caching

The technique described herein uses buffering at the root and intermediate nodes of the distribution tree to smooth the streaming video. Buffer availability at a node allows temporal caching of portions of the video streams. Temporal caching uses a differential caching technique in which different amounts of video data are cached at different nodes for transmission over a heterogeneous internetwork. Caching at the root node allows the root node to smooth an incoming live or stored video stream, and transmit the resultant schedule to a downstream node. The buffers at the internal nodes allow each node to accommodate the difference between the node's incoming and outgoing transmission schedules when the outgoing and incoming link capacities are different. Additionally, by increasing the effective or virtual smoothing buffer size for the upstream node, these buffers provide more aggressive smoothing opportunity along the upstream link. Finally, when the children of a node have different effective buffer capacities, the smoothed transmission schedules are different along the different outgoing links. For a given incoming transmission schedule, the node buffer temporally caches video frames until they are transmitted along each outgoing link. Thus, differential caching allows the transmission schedule to each child to be decoupled to varying degrees depending on the size of the parents buffer cache. This can be extremely beneficial from a network resource requirements point of view. For example, the parent node can smooth more aggressively to a child having a larger effective buffer relative to a child with a smaller buffer. Differential caching allows the more constrained child to be served at its suitable pace, without requiring the frames to be retransmitted from higher up in the tree.

II. Application Aware Multicast

The approach described herein uses application-level information such as video frame sizes and system resource availability to deliver real-time streaming video data to clients for continuous playback. In addition to packet duplication and forwarding, nodes in the distribution tree may also perform transmission schedule computation, differential caching, and real-time streaming of video according to smoothed transmission schedules. Since large parts of the Internet are yet to become native multicast capable, the application-aware approach can be implemented on top of network level multicast primitives, where they exist, and use unicast communication between the nodes in the distribution tree elsewhere. The approach, by integrating smoothing with multicasting can provide far superior performance with respect to reducing the network bandwidth requirements, compared to multicasting the un-smoothed video.

III. Multicast Distribution of Smoothed Video

Figure 2:
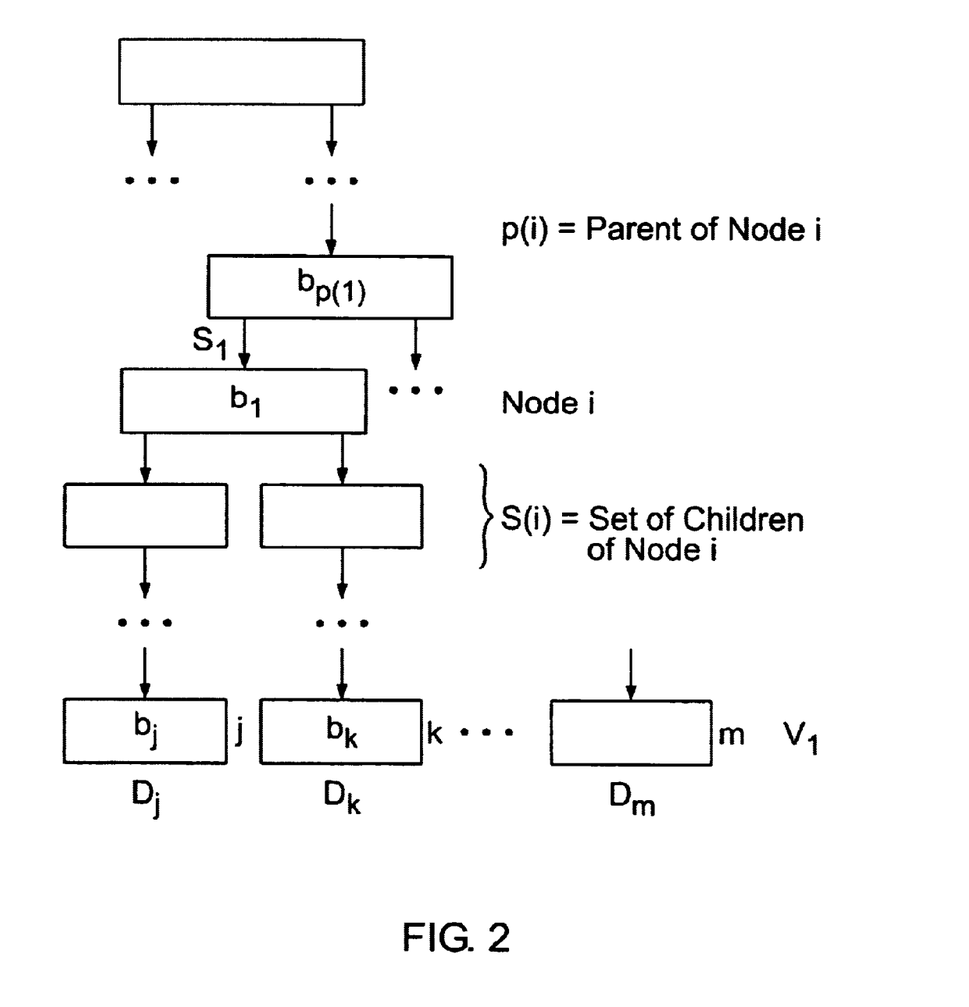
FIG. 2 is a diagram of network nodes.

FIG. 2 shows a directed tree $T=(V,E)$ where $V=\{0, 1, \ldots, n\}$ is the set of nodes (or smoothing servers) and E is the set of directed edges within the tree. Consider a node $i \in V$, let $p(i)$ denote the node's parent and $s(i)$ the set of children attached to i, i.e., $(p(i),i) \in E$ and $s(i)=\{j \in V:(i,j) \in E\}$. Assume node 0 to be the root server in the tree. Let $V_1 \subset V$ be the set of leaves; $V_1=\{i \in V:s(i)=\emptyset\}$. Node 0 can be the source server of the video, or, the video may be streaming into the root from a remote source. Also, a leaf can be an end client, or an egress node in the distribution tree. Herein, the terms "root" and "source" are used interchangeably as are "leaf" and "client".

Associated with node $i \in V$ is a buffer capacity $0 \leq b_i < \infty$. Without the loss of generality, assume a discrete time model where one time unit corresponds to the time between successive frames (e.g., 33 msec for 30 frames per second full motion video). Consider an N-frame video stream where the size of frame i is $f_i$ bits, $1 \leq i \leq N$ which arrives at node 0 destined for all nodes $i \in V_1$. Associated with this video stream is an arrival vector $A=(A_0, \ldots, A_N)$ in which the k-th component corresponds to the cumulative amount of data from the stream which has arrived at node 0 by time $k=0,1, \ldots, N$. It is assumed that $A_K \geq A_{K-1}$, $1 \leq k \leq N$. For each node $i \in V_1$, $D=(D_0, \ldots, D_N)$ denotes the client playback vector where $D_k$ represents the cumulative amount of data from this stream that must be removed at leaf i by $k=0, 1, 2, \ldots, N$ time units since the start of playback. It is assumed that $D_0=0$ and $D_k \geq D_{k-1}$, $1 \leq k \leq N$. For example, $D_k=\Sigma_{j=1}^{k} f_j$ if output from the leaf is the original un-smoothed video. For simplicity, assume here that all clients have the same playback vector. Optimal Multicast Smoothing of Streaming Video Over an Internetwork, Subhabrata Sen, Don Towsley, Zhi-Li Zhang, and Jayanta Dey, UMASS TECHNICAL REPORT 98-77, located at ftp://ftp.cs.umass.edu/pub/techrept/techreport/1998/UM-CS-1998-077.ps, incorporated by reference herein, formulates a more general case where clients have different playback vectors. The case where the root server has an "infinite" buffer, in the sense that $b_0 \geq D_N$, is referred to herein as the infinite source model, where as the case where $b_0 < D_N$ is referred to as the finite source model.

Associated with each node $i \in V \backslash \{0\}$ is a schedule $S_i=(S_{i,0}, \ldots, S_{i,N})$ in which the k-th component denotes the cumulative amount of data transmitted by node $p(i)$ to node i by time $k=0, 1, \ldots, N$, $1 \leq i \leq n$. The notation "$\backslash \{0\}$" is used herein to denote "excluding zero". Note that $S_0=A$, and $S_{i,k} \geq S_{i,k-1}$, $1 \leq k \leq N$. A set of schedules $\{S_i\}_{i \in V}$ is said to be feasible if, simultaneously using the component schedules in the set for video distribution along the tree does not violate any system constraints, and results in lossless, starvation-free playback at each leaf.

In general, the time the root server starts transmitting a video stream (or the time when the video stream begins arriving at the root) may be different from the time a leaf starts playing back the video stream. The difference between these two start points is referred to as startup delay (w). For any given startup delay $w \geq 0$, if the time the server starts transmitting a video stream as the reference point (i.e., time 0), then the playback vector D at the leaf i will be shifted w time units to the right. This shifted playback vector is represented by $D(w)=(D_0(w), D_1(w), \ldots, D_{N+w}(w))$, where $D_i(w)=0$ for $0 \leq i \leq w$, and $D_i(w)=D_{i-w}$ for $w+1 \leq i \leq N+w$. In this case, the root has $N+w+1$ time units to transmit video stream, namely, $S_j=(S_{j,0}, S_{j,1}, \ldots, S_{j,N+w})$, $j \in s(0)$. For ease of notation, the arrival vector A (which starts at time 0) is extended with w more elements, namely, $A=(A_0, \ldots, A_{N+w})$, where $A_i=A_N$ for $N+1 \leq i \leq N+w$. If time 0 is the instant when the leaf starts the playback, then the arrival vector A is shifted w time units to the left. The corresponding arrival vector is denoted by $A(-w)=(A_{-w}(w), A_{-w+1}(w), \ldots, A_N(w))$ where for $-w \leq i \leq N-w$, $A_i(w)=A_{i+w}$, and $A_i(w)=A_N$ for $N-w+1 \leq i \leq N$. Similarly, the root starts transmission at time $-w$ according to schedule $S_j=(S_{j,-w}, \ldots, S_{j,0}, \ldots, S_{j,N})$. In the following discussion, the time the root server starts transmission should be assumed to be time 0 unless otherwise stated. Depending on the context, A and D denote either the generic arrival or playback vector, respectively, or the appropriately shifted version.

Buffer Constrained Multicast Smoothing

Given a set of buffer allocations $\{b_i\} i \in V$, and consumption vector D at the leaves of the distribution tree, let $S(T, \{b_i\}, A, D)$ denote the set of feasible schedules. In this context, the set $\{S_i\}_{i \in V}$ is feasible if $$\max\{S_{p(i)} - vec(b_{p(i)}), \max_{j \in g(i)} S_j\} \leq \quad (1)$$

$$S_i \leq \min\{\min_{j \in g(i)} S_j + vec(b_i), S_{p(i)}\}, i \in V \backslash V_l,$$

$$\max\{S_{p(i)} - vec(b_{p(i)}), D\} \leq S_i \leq \min\{D + vec(b_i), S_{p(i)}\}, i \in V_l, \quad (2)$$

where $S_0 = A$.

Intuitively, at node i, at any time k, the cumulative incoming data $S_{i,k}$ should be sufficient to satisfy the cumulative outgoing data to the child nodes, and should not exceed the cumulative data been received at its parent p(i). Also, $S_i$ should transmit data fast enough to prevent buffer overflow at p(i), but not fill up the buffer at i so quickly that the transmission to some child $\{S_j\}_{j \in s(i)}$ is unable to transmit data from the buffer in time, before it gets overwritten.

The following inequalities follow:

$$S_i \leq S_{p(i)} \leq S_i + vec(b_i), i \in V \backslash \{0\}. \tag{3}$$

Two important considerations in this setting are:
1. Buffer Feasibility: is the buffer allocation feasible, i.e., is the set of feasible schedules $S(T,\{b_i\},A,D)$ nonempty? Note that the feasibility question arises as all the buffer allocations are assumed to be finite. Given a particular arrival vector A and playback vector D at the leaves, it is possible that no feasible transmission schedule is possible at one or more edges in the tree, due to buffer overflow at the source or sink of that edge.
2. Optimal smoothed schedules: for a feasible buffer allocation, what is the optimal set of smoothed transmission schedules $\{S_i\}_{i \in V}$?

B. Rate Constrained Multicast Smoothing

Assume that, instead of buffering capacity at the nodes, the link bandwidths in the distribution tree are the constraints. Consider the infinite source model, i.e. $b_0 \geq D_N$.

Following the notation introduced earlier in this section, the client playback vector at node $i \in V_1$ is $D=\{D_0, \ldots, D_N\}$, where $D_i$ is the cumulative amount of data consumed by a client i. For $i \in V \backslash \{0\}$, a rate constraint $r_i$ is associated with the link (p(i),i) which specifies the bandwidth available on the link $S_i=(S_{i,0}, S_{i,1}, \ldots)$ denotes a schedule used by node p(i) to transmit data on the link (p(i),i) to node i, where $S_{i,k}$ is the cumulative amount of data transmitted by time k. The schedule $\{S_i\}_{i \in V}$ is a feasible schedule if the following conditions are satisfied:

$$peak(S_i) \leq r_i, i \in V \backslash \{0\}, \max_{j \in g(i)} S_j \leq S_i \leq S_{p(i)} \text{ if } i \in V - V_l, \tag{4}$$

or $D \leq S_i \leq S_{p(i)}$ if $i \in V_l$. $\tag{5}$

Define $S(T,\{r_i\},A,D)$ to be the set of feasible transmission schedule sets for this system. The system determines the following:
1. Minimum Startup Delay: i.e., the minimum (common) playback startup delay $w^*$ for the clients for which a feasible transmission schedule exists for this system, i.e., $S(T,\{r_i\},A,D) \neq \emptyset$. Due to the transmission rate constraints, some minimum startup delay may be required to build up sufficient data to guarantee starvation-free playback at each client. Here assume that all the clients start playback at the same time.
2. Optimal buffer allocation: i.e., the minimum buffer allocation $b_i$ at each node $i \in V \backslash \{0\}$ of the distribution tree, and what is the minimum total buffer allocation $b = \Sigma_{i \in V \backslash \{0\}} b_i$ among schedules for the system. As explained before, the buffer is used for differential caching. Observe that for a given set of feasible schedules $\{S_i\}_{i \in V}$, the buffer allocation $\{b_i\}_{i \in V \backslash \{0\}}$ for the distribution tree is said to be feasible if the following constraints are satisfied: $b_i$ must be sufficiently large to ensure lossless video transmission, namely, it must be able to accommodate both (a) the maximum difference between the amount of data transmitted from node i to child node l according to a feasible schedule $S_l$ and that from node i to another child node k according to a schedule $S_l$ and that transmitted from node i to a child node k according to a schedule $S_k$. Formally, $$b_i \geq \max_{l,k \in g(i)} \{\max\{S_l - S_k\}\}, \tag{6}$$

$$b_i \geq \max_{k \in g(i)} \{\max\{S_i - S_k\}\}. \tag{7}$$

IV. Overview of Single Link Smoothing

This section describes the single link smoothing model and some important concepts and results which are used in deriving solutions for the multicast scenario.

Figure 3:
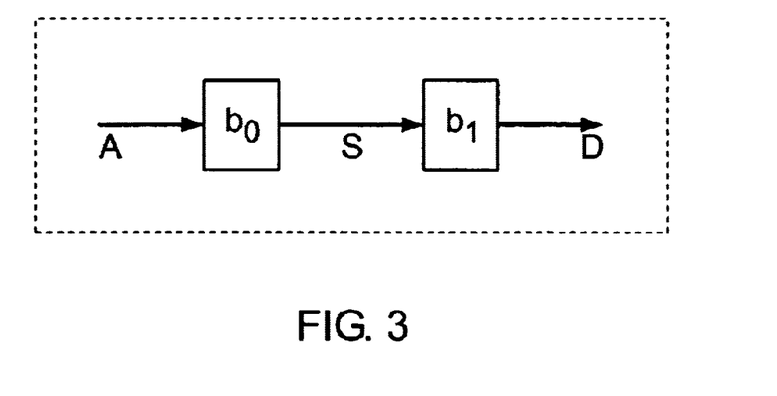
FIG. 3 is a diagram of a single link.

FIG. 3 shows a video transmitted across the network via a smoothing server node (which has a $b_0$ bit buffer) to a smoothing client node (which has a $b_1$ bit playback buffer). The model for the single link case can be derived from the distribution tree model of FIG. 2 by setting n=1. Consider next the buffer and rate constrained versions of this problem.

A. Buffer Constrained Single Link Optimal Smoothing

Here the server and client buffers ($b_0$ and $b_1$) are limiting resources. The smoothing problem involves computing transmission schedules which can transmit video from the server to the client in such a way as to reduce the variability of the transmitted video stream, thereby making efficient use of the network bandwidth.

To ensure lossless, continuous playback at the client, the server transmits sufficient data to avoid buffer underflow at the client without overflow in the server buffer. This imposes a lower constraint, $L_t=\max\{D_t(w), A_t-b_0\}$, on the cumulative amount of data that the server can transmit by any time t, $0 \leq t \leq N+w$. In order to prevent overflow of the client playback buffer, the cumulative amount of data received by the client by time t cannot exceed $D_{t-1}(w)+b_1$. This leads to the following upper constraint $U_t=\min\{D_{t-1}(w)+b_1,A_t\}$, $0 \leq t \leq N+w$. Given these lower (buffer underflow) and upper (buffer overflow) constraint vectors $L=(L_0, \ldots, L_{N+w})$ and $U=(U_0, \ldots, U_{N+w})$, a transmission schedule $S=(S_0, S_1, \ldots S_{N+w})$ is said to be feasible with respect to L and U if $S_0=L_0$, $S_{N+w}=L_{N+w}$, and S neither underflows nor overflows the server or client buffer, i.e. $L \leq S \leq U$.

Figure 4:
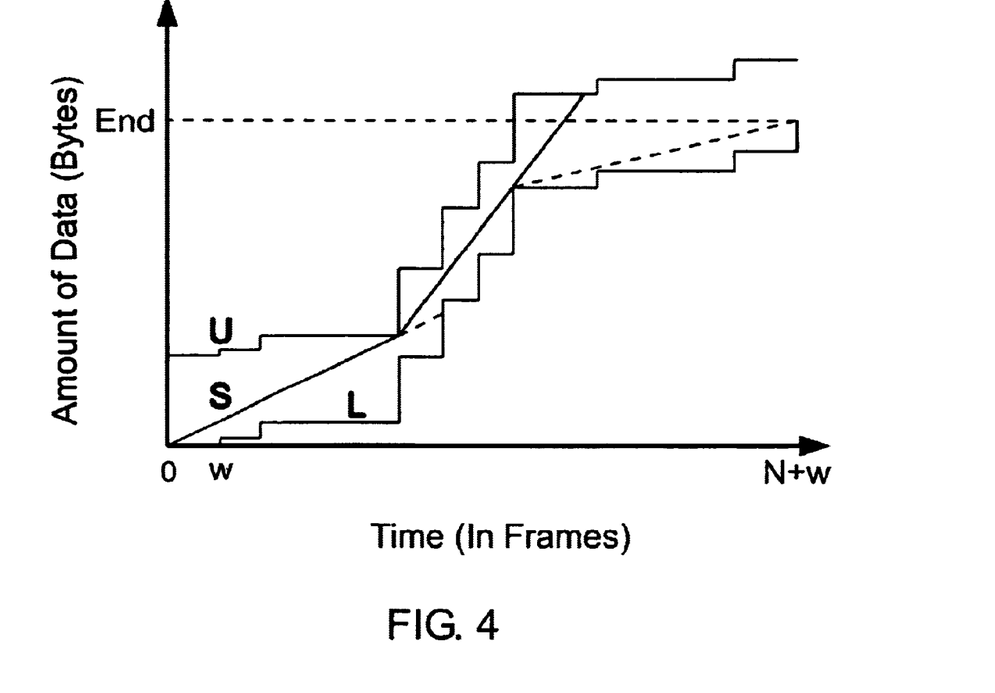
FIG. 4 is a graph of a feasible transmission schedule.

FIG. 4 shows an example of a feasible schedule S that does not violate the lower or upper constraints. In general, for a given pair of constraint vectors (L,U) such that $L \leq U$, multiple feasible transmission schedules S may exist. Among all feasible schedules, the system finds a smooth schedule that minimizes network utilization according to some performance metrics. In J. D. Salehi, Z. -L. Zhang, J. F. Kurose, and D. Towsley, "Supporting stored video: Reducing rate variability and end-to-end resource requirements through optimal smoothing," *IEEE/ACM Trans. Networking*, vol. 6, pp. 397–410, August 1998, a measure of smoothness based on the theory of majorization is described, and the resulting smoothed schedule minimizes a wider range of bandwidth metrics such as the peak rate, the variability of the transmission rates as well as the empirical effective bandwidth. Henceforth, this "optimal schedule" (linear time construction) is referred to as the majorization schedule. A majorization operation is denoted by the symbol (<).

Given a majorization schedule $S^*$, we say k, $1 \leq k \leq N+w-1$, is a change point of the schedule, if the transmission rate changes at time k. Moreover, k is said to be a convex change point if the transmission rate increases at k. Similarly, k is said to be a concave change point if the transmission rate decreases at k. A feature of the majorization schedule is that the convex (concave) change points occur precisely at the times k such that $S_k^*=U_k(S_k^*=L_k)$. This property leads to the following Lemma which is critical to constructing optimal smoothing schedules for the distribution tree scenario.

Lemma 1: Let $L_1 \leq U_1$ and $L_2 \leq U_2$ such that $L_1 \leq L_2$ and $U_1 \leq U_2$. Then $S_1^* \leq S_2^*$. Moreover, if $L_1 = L_2$, then any concave or convex change point of $S_1$ is also a concave or convex point of $S_2$.

Rate Constrained Single Link Smoothing

Next consider the dual problem of the rate constrained single link smoothing, where the bandwidth of the link connecting the server and the client is constrained by a given rate r. Due to constraints, the buffer at the client should be sufficiently large to ensure continuous video playback at the client. Furthermore, it may be necessary for the server to start video transmission sufficiently early. In this context, a server transmission schedule is feasible if the transmission rate of the schedule does not exceed the rate constraints (as well as the arrival vector) and the amount of data needed for the client playback is satisfied.

Figure 5:
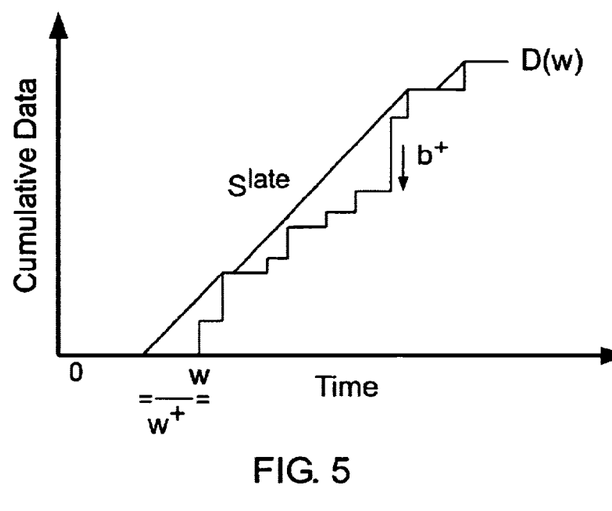
FIG. 5 is a graph of a lazy transmission schedule.

Assume that the client playback vector starts at time 0, and as before, the cumulative client playback vector is denoted by $D(0)=(D_0(0),D_1(0),\ldots,D_N(0))$. Then, given a startup delay w, assume that the arrival vector starts at time $-w$ instead of time 0, with the shifted arrival vector $A(-w)$. For the infinite source model, a feasible transmission schedule $S^{late}$ can be constructed that transmits data as late as possible, while obeying rate constraint r. We refer to this as the lazy schedule. FIG. 5 illustrates an example of a lazy schedule.

Define $b^*(r)$ to be the minimum buffer required at the client for the transmission schedule $S^{late}$ without incurring loss of data, and $w^*(r,A)$, the minimum startup delay with respect to which $S^{late}$ conforms to the arrival vector, i.e. $S_k^{late} \leq A_K(-w^*)$, for $k \geq w^*$. Then $$b^*(r) = \max_{k \geq 0}\{S_k^{late} - D_k(0)\}, \qquad (8)$$

$$w^*(r,A) = \min\{w \geq 0 : A_k(-w) - S_k^{late} \geq 0, -w \geq k \geq N\}. \qquad (9)$$

It can be shown that $b^*$ is the minimal buffer requirement and $w^*$ is the minimal start-up delay among all feasible schedules with rate constraint r and arrival vector A. Also, $b^*(r)$ and $w^*(r,A)$ are non-increasing functions of the rate constraint r.

The next theorem relates the rate constrained optimal smoothing problem to its dual buffer constrained optimal smoothing problem. For ease of exposition, time 0 is chosen as the time that $A_0$ arrives at the server and the server starts video transmission. Corresponding to any playback startup delay $w \geq w^*$, the client playback vector is $D(w)$. The new lazy schedule $S^{late}$ is then the original $S^{late}$ shifted w time units to the right. By the definition of $w^*$, we have $w^* = \min\{w > 0 : A_K - S_k^{late} \geq 0, 0 \leq k \leq N+w\}$.

Theorem 1: Let $S(r,A,D)$ be the set of all feasible schedules with respect to rate constraint r and the arrival vector A. Let $b^*(r)$ and $w^*(r,A)$ be the minimum client buffer requirement and startup delay of $S(r,A,D)$. For any $w \geq w^*(r,A)$ define $L=D(w)$ and $U=\min\{A,D(w)+vec(b^*(r))\}$. Then the majorization schedule $S^*$ with respect to the buffer constraints L, U is also a feasible schedule with respect to the rate constraint r, and peak$(S^*)$=peak$(S^{late})$. In particular, if peak $(S^{late})$=r, then peak$(S^*)$=r.

As a consequence of theorem 1, note that for $w=w^*$, the majorization schedule $S^*$ is majorized (thus "smoothest" under the measure of majorization) by any feasible schedule in $S(r,A,D)$ which has the same client buffer requirement $b^*(r)$ and startup delay $w^*(r,A)$.

V. Optimal Multicast Smoothing

This section presents solutions to the multicast problems described above. This section uses the results for the single link smoothing problem to build a solution for the multicast problem. A key aspect of the approach involves computing upper and lower constraint curves and exploiting the properties of majorization and lazy transmission schedules.

A. Buffer Constrained Multicast Smoothing

Analogous to the single link case, first compute upper and lower constraint curves at the individual nodes in the distribution tree. Unlike the single link case, the constraints at a node can be affected by both the constraint at its directly connected nodes as well as at remote nodes.

B. Determining an Upper Constraint

For $i \in V$, define a vector $U_i^b$ recursively as follows.

$$U_i^b = \begin{cases} D + vec(b_i) & \text{for } i \in V_l \\ \min_{j \in g(i)} U_j^b + vec(b_i) & \text{for } i \in V \setminus V_l \end{cases} \qquad (10)$$

$U_i^b$ can be the buffer overflow (or upper) constraint vector for node i when it is fed by the source of the pre-recorded video, i.e., $A_K = D_N$, $k=0,\ldots,N$. As described below, that a buffer constraint somewhere up stream in the tree can impose a more stringent constraint than $U_i^b$ on the transmission schedules for the subtree rooted at node i.

For $i \in V$, let P(i) denote the set of nodes on the path from the root, 0, to node i and define $$U_i^c = \min_{j \in P(i)} U_j^b. \qquad (11)$$

where $U_i^c$ is referred to as the effective buffer overflow constraint vector of the subtree rooted at i. Observe that $U_i^c \leq U_i^b$. The effective overflow vectors exhibit the following properties.

$$U_i^c \leq U_{p(i)}^c \leq U_i^c + vec(b_{p(i)}). \qquad (12)$$

C. Determining a Lower Constraint:

Also associated with node i is an effective buffer underflow constraint vector, $L_i^c$ defined by the following recurrence relation:

$$L_i^c = \begin{cases} D, & i = 0, \\ \max(D, L_{p(i)}^c - vec(b_{p(i)})), & i \neq 0. \end{cases} \qquad (13)$$

Now consider a single link system with an arrival vector A in which the source has a buffer capacity of size $G_{p(i)} = \Sigma_{j \in P(p(i))} b_j$ and the receiver has buffer overflow and underflow constraints $U_i^c$ and $L_i^c$. Let $S_i^*$ denote the majorization schedule for this system. The following lemma shows that the schedules $\{S_i^*\}_{i=1,\ldots,n}$ are feasible transmission schedules for the buffer constrained multicast scenario. This result hinges on a key property of majorization schedules (Lemma 1).

Lemma (2): The schedule $S_i^*$ satisfies the following constraints.

$$\max\{S_{p(i)}^* - vec(b_{p(i)}), \max_{j \in g(i)} S_j^*\} \leq S_i^* \leq \min\{\min_{j \in g(i)} S_j^* + vec(b_i), S_{p(i)}^*\},$$

$$i = 1, \ldots n.$$

Now the following result regarding whether a feasible set of transmission schedules exists for a given buffer allocation $\{b_i\}_{i \in V}$ and leaf consumption vector D:

Theorem 2: $S(T,\{b_i\},A,D) \neq \emptyset \Leftrightarrow \forall i \in V_l^* (L_i^c \leq U_i^c)$.

The following theorem regarding the optimality of $\{S_i^c\}_{i=1}^n$ answers the second question raised earlier.

Theorem 3:
 The majorization schedules $\{S_i^*\}_{i=1}^n$ associated with the finite source single link problems with arrival vector A, source buffers $\{G_i\}$, and buffer overflow and underflow vectors $\{U_i^c\}_{i \in V}$ and $\{L_i^c\}_{i \in V}$ satisfy the following relations.

$$S_i^* \leq S_i, \forall \{S_i \in S(T,\{b_i\},A,D).$$

D. Buffer Feasibility Check

Figure 6:
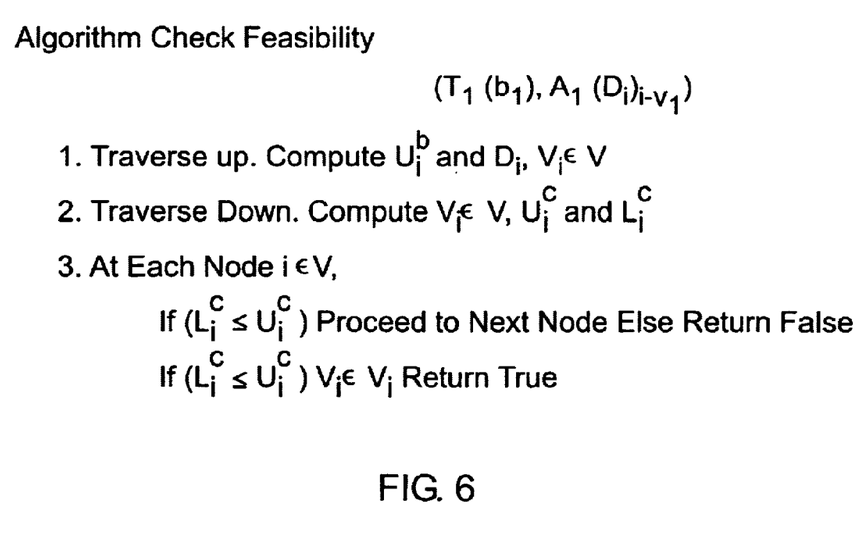
FIG. 6 is a listing of pseudo-code for a program that verifies feasible transmission schedule exists.

FIG. 6 shows a procedure, "check feasibility", for checking if the buffer allocation is feasible. The procedure returns true if $S(T,(b_i),A,D) \neq \emptyset$, and otherwise returns False. Each traversal moves either up the tree starting at the leaves (upward traversal) or down the tree starting at the root node 0 (downward traversal), processing all nodes at the same level before going to the next level.

An upward traversal uses relation (10). A downward traversal uses (11) to compute $U_i^c$, and (13) to compute $L_i^c$. Theorem 2 is then used to check for feasability.

Given that $U_i^c$, and $L_i^c$ can be computed in O(N) time the complexity of the above algorithm is O(nN).

E. Multicast Smoothing Procedure

Figure 7:
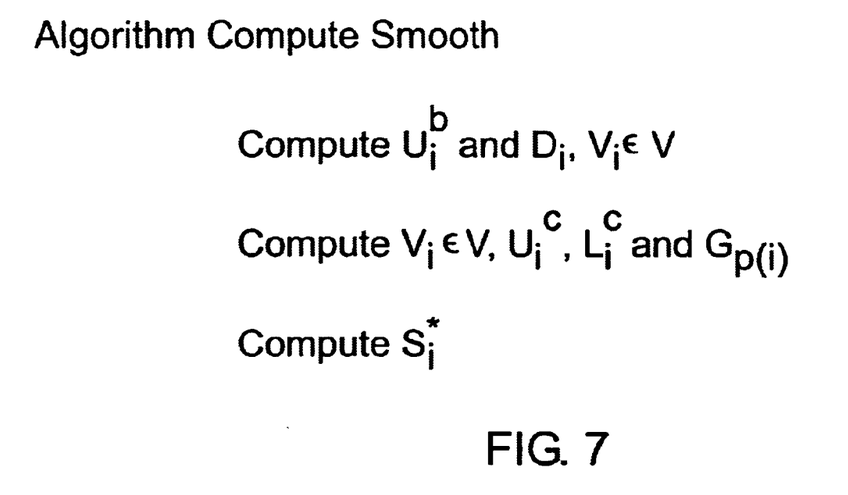
FIG. 7 is a listing of pseudo-code for a program that determines a smooth transmission schedule for each link.

FIG. 7 shows a simple procedure for computing the smoothed schedules, "compute smooth", for the multicast tree, given a feasible buffer allocation to the nodes in the tree. This involves traversing the distribution tree three times. The procedure proceeds as "check feasibility" proceeded, with the additional computation of $G_{p(i)}$ using $G_{p(i)}=G_{p(p(i))}+b_{p(i)}$. However, "compute smooth" computes $S_i^*$, the majorization schedule associated with the lower and upper constraints $L_i=\max(A-vec(G_{p(i)}), L_i^c)$ and $U_i=\min(A, U_i^c)$.

By theorem 3, the set $\{S_i^*\}_{i=1}^n$ is optimal. Given that $S_i^*$ can be computed in O(N) time, the complexity of the above algorithm is O(nN). Note that differential caching at intermediate node buffers can enable this smoothing, by temporarily caching differences between, and thereby temporally decoupling to some extent, the transmissions between faster and slower sections of the distribution tree.

VI. Rate Constrained Optimal Multicast Smoothing

A. Determining the Minimum Startup Delay

For each $i \in V\setminus\{0\}$, consider a rate constrained single link problem with the rate constraint $r_i$, the arrival vector A and the client playback vector D. Let $b_i^*$ and $w_i^*$ be the minimum buffer allocation and startup delay required for the single link problem. Then, the minimum common startup delay for the clients is given by $w^* = \max_{k \in V\setminus\{0\}} w_k^*$.

Given this minimum startup delay $w^*$ and assuming that the root server starts video transmission at time 0, the playback vector at client $i \in V_l$ is then $D(w^*)$

B. Determining Buffer Allocation

The optimal buffer allocation problem mentioned above can be addressed. For $i \in V\setminus\{0\}$, define the effective buffer requirement b recursively as follows:

$$b_i^e = \begin{cases} b_i^*, & i \in V_l, \\ \max\{b_i^*, \max_{k \in g(i)} b_k^e\}, i \in V \setminus V_l. \end{cases} \quad (14)$$

Clearly, $b_i^* \leq b_i^e \leq b_{p(i)}^e$. Note that $b_i^e$ is the largest buffer allocated to any node in the subtree rooted at node i. As will be shown, $b_i^e$ is a the minimal buffer allocation required for the subtree rooted at node i such that a set of feasible schedule exists for the nodes in the tree.

Now for $i \in V\setminus\{0\}$, define $$\hat{b}_i = \begin{cases} b_i^e, & i \in V_l, \\ b_i^e - \min_{k \in g(i)} b_k^e, i \in V \setminus V_l. \end{cases} \quad (15)$$

Given this set of buffer allocations $\{\hat{b}\}_{i \in V\setminus\{0\}}$, define the effective buffer underflow vector at node i, $L_i^b$, as $L_i^b = D(w^*)$, and the effective buffer overflow vector at node i, $U_i^b$, as $$U_i^b = \begin{cases} D(w^*) + vec(b_i^e), & i \in V_l, \\ \min_{k \in s(i)} U_k^b + vec(\hat{b}_i), i \in V \setminus V_l. \end{cases} \quad (16)$$

Then

Lemma 3: The effective overflow vector has the following property:

$$U_i^b \leq U_{p(i)}^b \leq U_i^b vec(\hat{b}_{p(i)}), \quad (17)$$

$$U_i^b = D(w^*) + vec(b_i^e). \quad (18)$$

For $i \in V\setminus\{0\}$, let $S_1^*$ be the majorization schedule with respect to the lower and upper constraint vectors ($L_i^b$, min$\{A, U_1^b\}$). As in the case of the single link problem, the set of these majorization schedules, $\{S_i^*, i \in V\}$ (where $S_0^* \neq A$), is a set of feasible schedules for the rate constrained multicast smoothing system. Namely:

Theorem 4: the schedule $S_i^*$, $i \in V\setminus\{0\}$, satisfies the following constraints:

$$\max\{S_{p(i)}^* - vec(\hat{b}_{p(i)}), \max_{j \in g(i)} S_j^*\} \leq S_i^* \leq \min\{\min_{j \in g(i)} S_j^* + vec(\hat{b}_i), S_{p(i)}^*\}, \quad (19)$$

$$peak(S_i^*) \leq r_i. \quad (20)$$

Where it is understood that $\max_{j \in s(i)} S_j^* = D$ for $i \in V_l$ and $S_0^* = A$.

As a consequence of theorem 4, under the same buffer allocation $\{\hat{b}_i\}_{i \in V\setminus\{0\}}$ and startup delay $w^*$, the set of majorization schedules $\{S_i^*\}_{i \in V}$ gives us the set of the "smoothest" schedules among all feasible schedules for the rate constrained multicast smoothing problem.

The next theorem establishes the optimality of the buffer allocation $\{\hat{b}_i\}_{i \in V\setminus\{0\}}$.

Theorem 5: the buffer allocation $\{\hat{b}_i\}_{i \in V\setminus\{0\}}$ is optimal in the sense that the allocation minimizes, among all the feasible schedules for the system, both the total buffer allocation, $\Sigma_{i \in V\setminus\{0\}} \{\hat{b}_i\}$, and the buffer allocated for any node in the subtree rooted at node i (namely, the effective buffer allocation $b_i^e$ at node i), $i \in V\setminus\{0\}$. As a result, any smaller total buffer allocation will not result in a feasible set of transmission schedules for the system.

Figure 8:
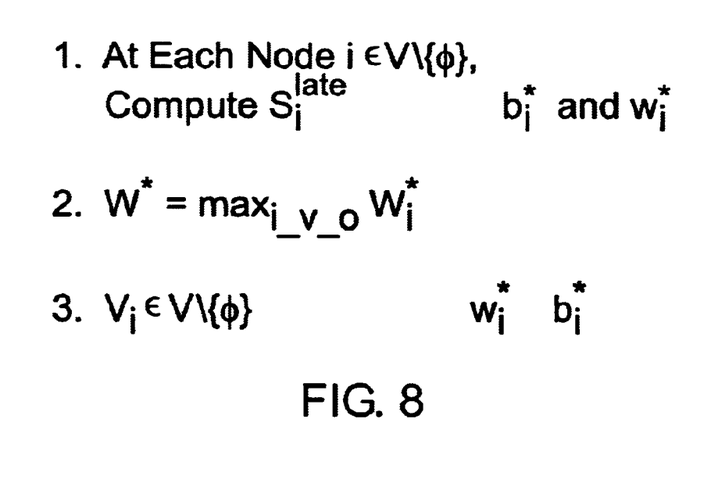
FIG. 8 is a listing of pseudo-code for a program that determines network node buffer sizes.

FIG. 8 shows a simple procedure, "allocate buffer", that computes the optimal buffer allocation for a given distribution tree. The procedure involves three traversals through the distribution tree, processing all the nodes at the same level before proceeding to the next one.

The procedure determines $b_i^*$ and $w_i^*$ using relations (8) and (9) respectively and determines the common minimum startup delay $w^* = \max i \in V\setminus\{0\}$ $w_i^*$. At node i, $b_i^e$ is determined using relation (14), and then $\hat{b}$ is determined late using (15). Since $S_i^{late}$ can be computed in time O(N), it is clear that the computation complexity of the above algorithm is O(nN).

Once the optimal buffer allocation is obtained, "compute smooth" can compute the set of optimally smoothed schedules for the multicast tree.

VII. Implementations

Figure 9:
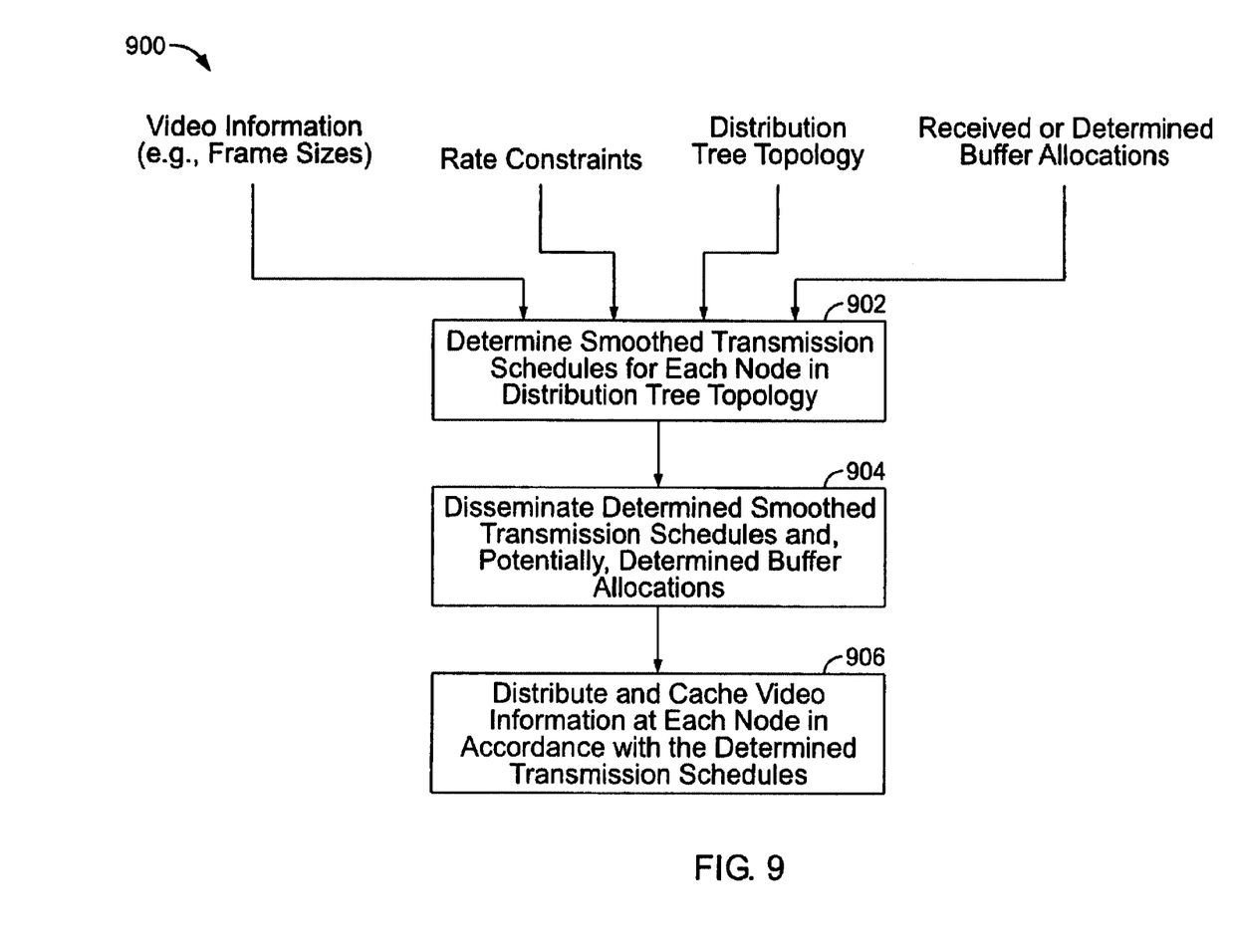
FIG. 9 is a flowchart of a process for determining transmission schedules and/or buffer allocation(s).

FIG. 9 shows a candidate process 900 for implementing the techniques described above. As shown, a selected node, such as a root node, can receive information describing a video (e.g., the frame sizes of a video), the network topology, rate constraints, and determined (e.g., as determined by the buffer allocation procedure of FIG. 8) or received buffer allocations. Based on the received and/or determined information, the process 900 can determine 902 smoothed transmission schedules for each node in the network topology, for example, by using the "compute smooth" procedure shown in FIG. 7. That is, the process 900 can determine a transmission schedule from a node to each of its children nodes. Thereafter, the selected node can send 904 each node the schedules determined for the node. Additionally, the process 900 can distribute any determined buffer allocations to different nodes. This can enable the other nodes to devote excess buffer resources to other uses. Finally, the streaming video begins 906 and each node caches and distributes video data in accordance with the node's transmission schedule.

FIG. 9 is merely one of many possible different processes that take advantage of the techniques described herein. For example, each node may independently receive the information needed to determine its own transmission schedule. Additionally, there is no requirement that the computing device used to determine the schedule be a source node or a particular intermediate node.

Figure 10:
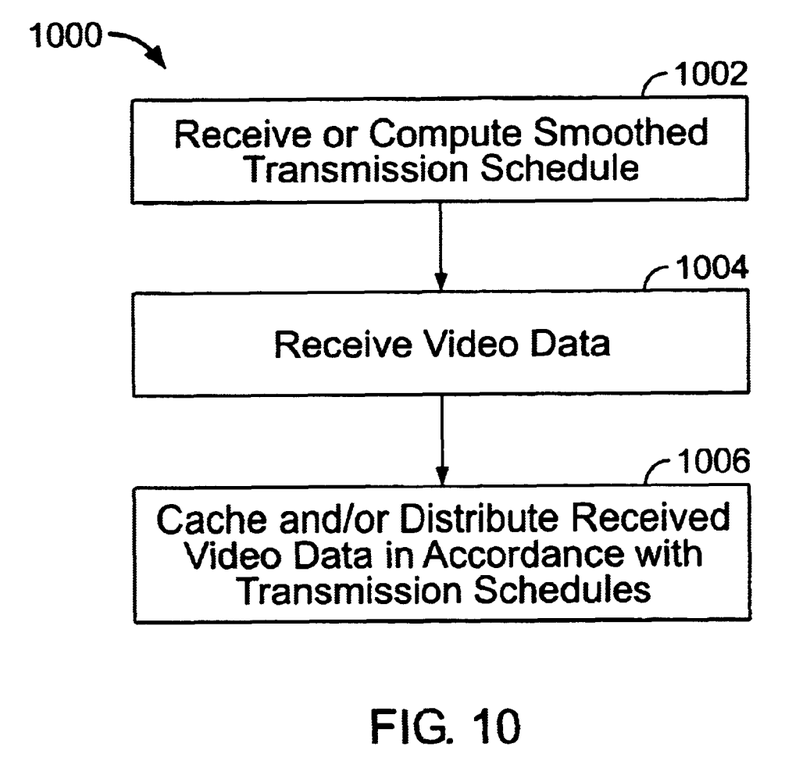
FIG. 10 is a flowchart of a process for transmitting data in accordance with one or more determined transmission schedules.

FIG. 10 is a flowchart of a process 1000 performed by nodes after receiving or determining a smoothed transmission schedule 1002. As shown, the node receives 1004 video information in accordance with its parent's transmission schedule and determines 1006 whether to cache and/or transmit the received information to one or more children nodes (or for display) based on its own transmission schedule.

The techniques described here are not limited to any particular hardware or software configuration; they may find applicability in any computing or processing environment. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferable stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Please incorporate "Optimal Multicast Smoothing of Streaming Video over an Internetwork", Subhabrata Sen, Don Towsley, Zhi-Li Zhang, and Jayanta Dey, Proc. IEEE Infocom '98, (New York, N.Y., March 1999) by reference, in its entirety, herein.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of multicasting video to multiple client nodes via intermediate nodes, the method comprising:

accessing video information descriptive of the video to be multicast;

accessing information describing a distribution tree of nodes from a source of the video to the multiple clients nodes via one or more internetwork nodes;

accessing rate constraints of nodes in the distribution tree;

accessing buffer allocations of the nodes in the distribution tree; and determining one or more smoothed transmission schedules for each node in the distribution tree based on the accessed video information, the accessed information describing the distribution tree, the accessed rate constraints of nodes in the distribution tree, and the accessed buffer allocations of the nodes in the distribution tree, the one or more transmission schedules describing the transmission of video data to one or more children nodes.

2. The method of claim 1, wherein accessing buffer allocations comprises determining buffer allocations based on the accessed video information, the accessed information descriptive of a distribution tree, and the accessed rate constraints.

3. The method of claim 1, wherein accessing rate constraints comprises receiving rate constraints.

4. The method of claim 1, wherein determining comprises:

determining an upper constraint for each node;

determining a lower constraint for each node; and determining a smoothing schedule based on the determined upper and lower constraints.

5. The method of claim 4, wherein determining a smoothing schedule comprises determining a majorization schedule.

6. The method of claim 1, further comprising distributing the determined transmission schedules to nodes in the distribution tree.

7. The method of claim 1, wherein the determined transmission schedules comprise schedules that cause at least one node to differentially cache data for distribution to the at least one node's children.

8. A computer program product, disposed on a computer readable medium, for multicasting video to multiple client nodes via intermediate nodes, the program including instructions for causing a processor to:

access video information descriptive of the video to be multicast;

access information describing a distribution tree of nodes from a source of the video to the multiple clients nodes via one or more internetwork nodes;

access rate constraints of nodes in the distribution tree;

access buffer allocations of the nodes in the distribution tree; and determine one or more smoothed transmission schedules for each node in the distribution tree based on the accessed video information, the accessed information describing the distribution tree, the accessed rate constraints of nodes in the distribution tree, the accessed buffer allocations of nodes in the distribution tree, and the one or more transmission schedules describing the transmission of video data to one or more children nodes.

9. The computer program of claim 8, wherein the instructions that access buffer allocations comprise instructions that determine buffer allocations based on the accessed video information, the accessed information descriptive of a distribution tree, and the accessed rate constraints.

10. The computer program of claim 8, wherein the instructions accessing rate constraints comprise instructions that receive rate constraints.

11. The computer program of claim 8, wherein the instructions that determine comprises instructions that determine an upper constraint for each node;

determine a lower constraint for each node; and determine a smoothing schedule based on the determined upper and lower constraints.

12. The computer program of claim 8, wherein the instructions that determine a smoothing schedule comprise instructions that determine a majorization schedule.

13. The computer program of claim 8, further comprising instructions that distribute the determined transmission schedules to nodes in the distribution tree.

14. The computer program of claim 8, wherein the determined transmission schedules comprise schedules that cause at least one node to differentially cache datal for distribution to the at least one node's children.

\* \* \* \* \*